3,143,559
12α-LOWER ALKYL STEROIDS AND THEIR
METHOD OF PREPARATION
Gordon H. Thomas, Birmingham, England, and Josef
Fried, Princeton, N.J., assignors to Olin Mathieson
Chemical Corporation, New York, N.Y., a corporation
of Virginia
No Drawing. Filed Oct. 3, 1962, Ser. No. 228,000
4 Claims. (Cl. 260—397.45)

This application is a continuation-in-part of our application, Serial No. 847,459, filed October 20, 1959, now abandoned, which in turn is a continuation-in-part of our application, Serial No. 696,904, filed November 18, 1957, now abandoned.

This invention relates to the synthesis of steroids, and has for its object the provision of a new class of physiologically active steroids, which may be represented by the formula

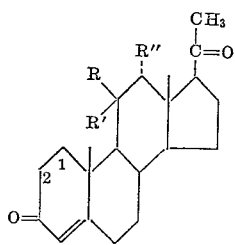

wherein the 1,2-position is saturated or double-bonded, R is hydrogen, R' is α-hydroxy, α-acyloxy, or β-hydroxy, or together R and R' is keto, and R'' is lower alkyl (preferably methyl).

These new steroids of this invention are prepared by interacting a 3,20-diketal of 9α-fluoro-11-ketoprogesterone or 9α-fluoro-$\Delta^{1,4}$-pregnadiene-3,11,20-trione with lithium lower alkyl (e.g., lithium methyl), thereby yielding the 3,20-diketal of 12α-methyl-11-ketoprogesterone and of 12α-methyl-$\Delta^{1,4}$-pregnadiene-3,11,20-trione, respectively. The resulting 12α-methyl diketal can then be hydrolyzed in the usual manner to give the free 12α-methyl-11-ketoprogesterone or 12α-methyl-$\Delta^{1,4}$-pregnadiene-3,11,20-trione; or reduced to yield the corresponding 11-hydroxy derivative. If the reduction is carried out with a reducing agent such as lithium aluminum hydride, the 3,20-diketal of 12α-methyl-11β-hydroxyprogesterone (or of 12α-methyl-$\Delta^{1,4}$-pregnadiene-11β-ol-3,20-dione) is obtained as the major product. If, on the other hand, the reduction is done by means of a reducing agent such as lithium metal in liquid ammonia, the 3,20-diketal of 12α-methyl-11α-hydroxyprogesterone (or of 12α-methyl-$\Delta^{1,4}$-pregnadiene-11α-ol-3,20-dione) is recovered. Both of these 11-hydroxy derivatives can then be hydrolyzed in the usual manner to yield the respective 3,20-diketone derivative. The resulting 12α-methyl-11α-hydroxy-progesterone (or 12α-methyl-$\Delta^{1,4}$-pregnadiene-11α-ol,3,20-dione) can then, if desired, be acylated in the usual manner, as by treatment with the acid anhydride or acyl halide of the desired acid, to yield the corresponding 11α-acyloxy derivative.

This series of steps is illustrated by the following equations wherein 9α-fluoro-11-ketoprogesterone 3,20-bis-ethylene ketal is employed as the starting material:

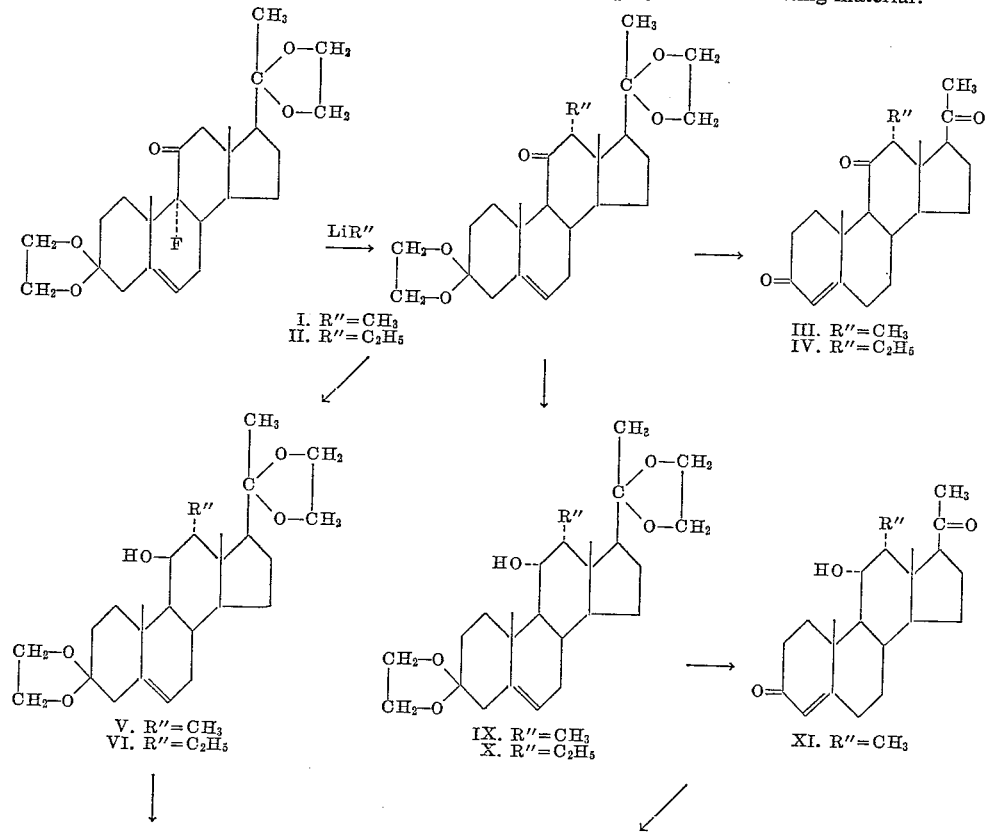

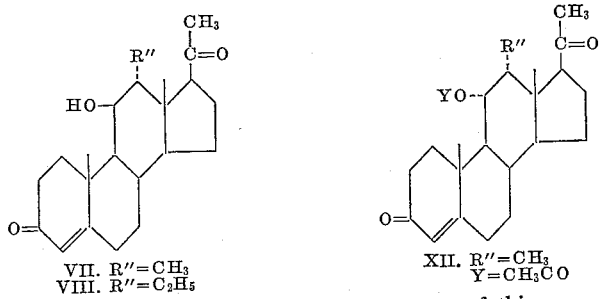

VII. R″=CH₃
VIII. R″=C₂H₅

XII. R″=CH₃
Y=CH₃CO

As suitable starting materials for the process of this invention may be mentioned any 3,20-diketal of 9α-fluoro-11-ketoprogesterone or of 9α-fluoro-Δ¹,⁴-pregnadiene-3,11,20-trione, as exemplified by the diketals with 1,2 or 1,3-dihydric alcohols such as ethylene glycol and propylene glycol. These starting 3,20-diketals can be prepared in the usual manner from 9α-fluoro 11-ketoprogesterone and 9α-fluoro-Δ¹,⁴-pregnadiene-3,11,20-trione, respectively, by treating the 3,20-dione with, for example, a dihydric alcohol, such as ethylene glycol and propylene glycol, in the presence of an acid catalyst. These ketals are then interacted with lithium lower alkyl (e.g., lithium methyl and lithium ethyl), preferably in an organic solvent for the steroid, such as benzene, the reaction being conducted at any normal temperature, such as ambient temperature. The reaction results in a mixture of two products, one of which is the desired diketal of 12α-methyl-11-ketoprogesterone (or of 12α-methyl-Δ¹,⁴-pregnadiene-3,11,20-trione), and the other is a diketal of 11α-methyl-9β,11β-oxidoprogesterone (or of 11α-methyl-9β, 11β-oxido-Δ¹,⁴-pregnadiene-3,20-dione). The products can then be separated by fractional crystallization.

The 12α-methyl-11-ketoprogesterone diketal (or 12α-methyl-Δ¹,⁴-pregnadiene-3,11,20-trione diketal) formed can then be hydrolyzed in the usual manner, as by treatment with a dilute aqueous acid at an elevated temperature, to yield the corresponding free 3,11,20-triketone derivatives.

The 12α-methyl-11-ketoprogesterone diketal, or its corresponding 1-dehydro analogue, can also be reduced to the corresponding 11-hydroxy derivative. If this reduction is done by means of a complex metal hydride, such as lithium aluminum hydride or lithium borohydride, preferably at an elevated temperature in an inert organic solvent (e.g., tetrahydrofuran), the corresponding 11β-hydroxy derivatives are formed (e.g., 12α-methyl-11β-hydroxyprogesterone 3,20-diketal and 12α-methyl-Δ¹,⁴-pregnadiene-11β-ol-3,20-dione 3,20-diketal), which in turn can be hydrolyzed as described hereinbefore to the free 3,20-diketone derivatives.

If, however, the reduction is carried out by means of an alkali metal (e.g., lithium) in liquid ammonia, then the 11α-hydroxy derivatives (e.g., 12α-methyl-11α-hydroxyprogesterone 3,20-diketal and 12α-methyl-Δ¹,⁴-pregnadiene - 11α - ol-3,20-dione 3,20-diketal) are formed. These 11α-hydroxy steroids can also be hydrolyzed to the free 3,20-diketone derivatives as described hereinbefore, or they can be acylated, in the usual manner, by treatment with an acyl halide or acid anhydride of the desired acid. Particularly preferred are the acyl chlorides or acid anhydrides of hydrocarbon carboxylic acid having less than ten carbon atoms, as exemplified by the lower alkanoic acids (e.g., acetic, propionic, and enanthic acid), the monocyclic aromatic carboxylic acids (e.g., benzoic and toluic acid), the monocyclic aralkanoic acids (e.g., phenacetic and β-phenylpropionic acid), the lower alkenoic acids, the cycloalkane carboxylic acids, and the cycloalkene carboxylic acids. The acylation is preferably conducted in the presence of an organic base, such as pyridine.

The steroids of this invention wherein free keto groups are present in the 3 and 20 positions are physiologically active substances which possess progestational activity. Hence the steroids of this invention can be used in lieu of known progestational steroids, such as progesterone, in the treatment of habitual abortion, being formulated for such administration in the same type of peroral preparations as progesterone, for example, with concentration and/or dosage based on the activity of the particular compound. Moreover, it has surprisingly been found that those compounds of this invention are many more times more active than are the corresponding 12-unsubstituted derivatives. Thus, whereas 11α-hydroxyprogesterone possesses only 1/40 the activity of progesterone, 12α-methyl-11α-hydroxyprogesterone is 1/8 as active a progestational steroid; and, whereas, 11β-hydroxyprogesterone possesses only 1/40 the activity of progesterone, 12α-methyl-11β-hydroxyprogesterone is twice as active as progesterone. In addition the steroids of this invention are useful intermediates in the preparation of the corresponding 9α-halo steroid derivatives by the general method described in U.S. Patent No. 2,852,511.

The following examples are illustrative of the invention (all temperatures being in centigrade):

EXAMPLE 1

*12α-Methyl-11-Ketoprogesterone 3,20-Bis-Ethylene Ketal (I)*

(a) PREPARATION OF 9α - FLUORO - 11 - KETOPROGESTERONE 3,20-BIS-ETHYLENE KETAL

A mixture of 10 g. of 9α-fluoro-11-ketoprogesterone, 350 ml. of benzene, 80 ml. of ethylene glycol and 200 mg. of para-toluene-sulfonic acid monohydrate is refluxed with stirring for 72 hours. The reaction mixture is then cooled to room temperature and neutralized with sodium bicarbonate solution. The phases are separated and the aqueous layer reextracted with additional amounts of benzene. The combined benzene extracts are washed with water, dried over sodium sulfate and evaporated to dryness in vacuo. The crude residue on crystallization from acetone-hexane yields about 11 g. of the essentially pure bis-ethylene ketal melting at about 179–182°. Recrystallization of this material from methanol gives an analytical sample of the following properties: M.P. about 189–190°; $[\alpha]_D^{23}$ —25°.

*Analysis.*—Calcd. for $C_{25}H_{35}O_5F$ (434.53): C, 69.10; H, 8.12. Found: C, 69.19; H, 8.18.

(b) PREPARATION OF 12α-METHYL-11-KETOPROGESTERONE 3,20-BIS-ETHYLENE KETAL

A solution of 9α-fluoro-11-ketoprogesterone 3,20-bis-ethylene ketal (10 g.) in benzene (100 ml.) is treated with an ethereal solution of lithium methyl (150 ml., 13.5 mg. of lithium metal/ml.). The solution is stirred for 4 hours at room temperature and then the excess lithium methyl is decomposed by the addition of ice. Chloroform (300 ml.) is added, and the mixture is washed several times with water, dried over sodium sulfate and evaporated in vacuo. Trituration of the residue with hexane gives about 4.2 g. of 12α-methyl-11-ketoprogesterone 3, 20-bis-ethylene ketal (I), M.P. about 135–138°. A second crop of crystals (about 2.4 g., M.P. about 124–130°) is obtained on concentrating the hexane mother liquor. Crystallization from methanol gives an analytical sample melting at about 139–142°, $[\alpha]_D$ −8.8° (c. 0.716 in $CHCl_3$);

$$\lambda_{max.}^{Nujol}\ 5.87\mu$$

*Analysis.*—Calcd. for $C_{26}H_{38}O_5$ (430.56): C, 72.50; H, 8.90. Found: C, 72.71; H, 8.90.

EXAMPLE 2

12α-Methyl-11-Ketoprogesterone 3,20-Bis-Ethylene Ketal (I)

3.5 g. of 9α-fluoro-11-ketoprogesterone 3,20-bis-ethylene-ketal in 280 ml. of ether is stirred at room temperature overnight with 53 ml. of an ethereal solution of lithium methyl (12.6 mg./ml.). Isolation as described in Example 1, followed by crystallization of the residue from methanol gives about 2.2 g. of the 12α-methyl-11-ketosteroid having M.P. about 135–138°. Concentration of the mother liquor yields a second crop of material which is recrystallized twice from chloroform-methanol to give a pure sample of 11α-methyl-9β,11β-oxidoprogesterone 3,20-bis-ethylene ketal (about 100 mg.), M.P. about 194–196°, $[\alpha]_D$ +97.6° (c. 1.02 in $CHCl_3$);

$\lambda_{max.}^{Nujol}$ no absorption in the hydroxyl or carbonyl region.

*Analysis.*—Calcd. for $C_{26}H_{38}O_5$ (430.56): C, 72.50; H, 8.90. Found: C, 72.32; H, 8.64.

Similarly, by substituting an equivalent amount of lithium ethyl for the lithium methyl in the procedures of Examples 1 and 2, 12α-ethyl-11-ketoprogesterone 3,20-bis-ethylene ketal (II) is obtained. Furthermore, any diketal may be substituted for the 3,20-bis-ethylene ketal in the procedures of Examples 1 and 2, thereby yielding the corresponding 3,20-diketal derivative.

EXAMPLE 3

12α-Methyl-Δ<sup>1,4</sup>-Pregnadiene-3,11,20-Trione 3,20-Bis-Ethylene Ketal By substituting an equal amount of 9α-fluoro-$\Delta^{1,4}$-pregnadiene-3,11,20-trione for the steroid reactant in the procedures of Examples 1 and 2, 12α-methyl-$\Delta^{1,4}$-pregnadiene-3,11,20-trione 3,20-bis-ethylene ketal is obtained.

EXAMPLE 4

12α-Methyl-11-Ketoprogesterone (III)

A solution of 300 mg. of 12α-methyl-11-ketoprogesterone 3,20-bis-ethylene ketal in 10 ml. methanol and 1 ml. of 8% sulfuric acid is heated under reflux for 4 hours. The mixture is then diluted with water, the precipitated solid (about 201 mg., M.P. about 154–156°) collected and crystallized from acetone-hexane. The resulting sample of 12α-methyl-11-ketoprogesterone melts at about 155–157°; $[\alpha]_D$ +227° (c. 1.36 in $CHCl_3$);

$$\lambda_{max.}^{EtOH}\ 236\ m\mu\ (15,800);\ \lambda_{max.}^{Nujol}\ 5.88,\ 5.96,\ 6.18\mu$$

*Analysis.*—Calcd. for $C_{21}H_{30}O_3$ (342.46): C, 77.15; H, 8.83. Found: C, 76.60; H, 8.76.

Similarly, by substituting 12α-ethyl-11-ketoprogesterone 3,20-bis-ethylene ketal for the 12α-methyl steroid in the procedure of Example 4, 12α-ethyl-11-ketoprogesterone (IV) is obtained. Furthermore, any other bis ketal derivative can be similarly hydrolyzed to yield the same free 3,11,20-triketone derivatives.

EXAMPLE 5

12α - Methyl-11β-Hydroxyprogesterone 3,20-Bis-Ethylene Ketal (V) and 12α-Methyl-11α-Hydroxyprogesterone 3,20-Bis-Ethylene Ketal (IX)

A solution of 1 g. of 12α-methyl-11-ketoprogesterone 3,20-bis-ethylene ketal in 50 ml. of dry tetrahydrofuran is heated under reflux with 1 g. of lithium aluminum hydride for 18 hours. Ice is added to the cooled solution to decompose excess reagent and then a saturated aqueous solution of sodium sulfate is added with stirring until the precipitated aluminum salts are formed into a slurry. The clear ether solution is decanted off and the inorganic material is washed twice with chloroform. The combined organic extracts are dried over sodium sulfate and then evaporated in vacuo. The residue is dissolved in 10 ml. benzene and absorbed on a column of 30 g. of alumina. Elution with benzene (900 ml.) and chloroform-benzene (1:9, 500 ml.), followed by crystallization from acetone-hexane, yields 12α-methyl-11β-hydroxyprogesterone 3,20-bis-ethylene ketal (V) (about 660 mg.) melting at about 169–175°. Crystallization from acetone-hexane affords an analytical sample which melts at about 177–179°; $[\alpha]_D$ −11.5° (c. 1.24 in $CHCl_3$);

$$\lambda_{max.}^{Nujol}\ 2.8\mu$$

*Analysis.*—Calcd. for $C_{26}H_{40}O_5$ (432.58): C, 72.19; H, 9.32. Found: C, 72.30; H, 9.20.

Elution of the column with chloroform-benzene (4:1, 400 ml.), followed by crystallization from acetone-hexane, yields 12α-methyl-11α-hydroxyprogesterone 3,20-bis-ethylene ketal (IX) (about 30 mg.), M.P. about 204–206°. Two crystallizations from acetone-hexane gives a sample which melts at about 209–210°; $[\alpha]_D$ −26.7° (c. 1.02 in $CHCl_3$);

$$\lambda_{max.}^{Nujol}\ 2.84\mu$$

*Analysis.*—Calcd. for $C_{26}H_{40}O_5$ (432.58): C, 72.19; H, 9.32. Found: C, 72.47; H, 9.20.

Similarly, by substituting 1 g. of 12α-ethyl-11-ketoprogesterone 3,20-bis-ethylene ketal or 12α-methyl-$\Delta^{1,4}$-pregnadiene-3,11,20-trione 3,20-bis-ethylene ketal for the 12α-methyl-11-ketoprogesterone 3,20-bis-ethylene ketal in the procedure of Example 5, 12α-ethyl-11β-hydroxyprogesterone 3,20-bis-ethylene ketal (VI) and 12α-ethyl-11α-hydroxyprogesterone 3,20-bis-ethylene ketal (X); and 12-methyl-$\Delta^{1,4}$-pregnadiene-11β-ol-3,20-dione 3,20-bis-ethylene ketal and 12α-methyl-$\Delta^{1,4}$-pregnadiene-11α-ol-3,20-dione 3,20-bis-ethylene ketal are obtained respectively.

EXAMPLE 6

12α-Methyl-11α-Hydroxyprogesterone 3,20-Bis-Ethylene Ketal (IX)

To a stirred solution of 12α-methyl-11-ketoprogesterone 3,20-bis-ethylene ketal (640 mg.) in 100 ml. of liquid ammonia and 20 ml. of methanol, is added 500 mg. of lithium in small pieces over 15 minutes. The liquid ammonia is allowed to evaporate at room temperature and the residue is diluted with 50 ml. of water. The precipitated solid (about 620 mg., M.P. about 193–207°) is collected, washed well with water and dried. Crystallization from methanol gives an analytical sample of the 11α-hydroxy compound (IX) which melts at about 211–213°; $[\alpha]_D$ −28.5° (c. 1.13 in $CHCl_3$). The identity of this sample of 12α-methyl-11α-hydroxyprogesterone 3,20-bis-ethylene ketal with that obtained in Example 5 is established by mixture melting point determination and comparison of infrared spectrum.

EXAMPLE 7

12α-Methyl-11β-Hydroxyprogesterone (VII)

A solution of 1.4 g. of 12α-methyl-11β-hydroxyprogesterone 3,20-bis-ethylene ketal in 30 ml. of methanol and 3 ml. of 8% sulfuric acid is heated under reflux for one hour. The mixture is diluted with water, the precipitated solid collected and crystallized from chloroform-methanol to give about 1.1 g. of 12α-methyl-11β-hydroxyprogesterone, M.P. about 235–238°. Crystallization from chloroform-methanol gives an analytical sample melting at about 238–240°, $[\alpha]_D$ +199° (c. 1.08 in $CHCl_3$);

$\lambda_{max.}^{EtOH}\ 241\ m\mu\ (16,600);\ \lambda_{max.}^{Nujol}\ 2.9,\ 5.91$ (inflection); 5.95, 6.14

*Analysis.*—Calcd. for $C_{22}H_{32}O_3$ (344.48): C, 76.70; H, 9.32. Found: C, 76.59; H, 9.41.

Similarly, 12α-ethyl-11β-hydroxyprogesterone 3,20-bis-ethylene ketal and 12α-methyl-$\Delta^{1,4}$-pregnadiene-11β-ol-3,20-dione 3,20-bis-ethylene ketal can be hydrolyzed to 12α-ethyl-11β-hydroxyprogesterone (VIII) and 12α-methyl-$\Delta^{1,4}$-pregnadiene-11β-ol-3,20-dione, respectively.

EXAMPLE 8

*12α-Methyl-11α-Hydroxyprogesterone (XI)*

A solution of 193 mg. of 12α-methyl-11α-hydroxyprogesterone 3,20-bis-ethylene ketal in 5 ml. of methanol and 1 ml. of 8% sulfuric acid is heated under reflux for one hour. Dilution with water gives about 147 mg. of 12α - methyl-11α-hydroxyprogesterone which melts at about 207–211°. Crystallization from methanol yields a pure sample having melting point 215–218°; $[\alpha]_D$ +155° (c. 1.02 in $CHCl_3$);

$\lambda_{max}^{EtOH}$ 241 m$\mu$ (15,700); $\lambda_{max}^{Nujol}$ 2.95, 5.92, 5.99, 6.22

*Analysis.*—Calcd. for $C_{22}H_{32}O_3$ (344.48): C, 76.70; H, 9.36. Found: C, 76.50; H, 9.23.

Similarly, 12α-ethyl 11α-hydroxyprogesterone 3,20-bis-ethylene ketal and 12α-methyl-$\Delta^{1,4}$-pregnadiene-11α-ol-3,20-dione 3,20-bis-ethylene ketal can be hydrolyzed to 12α-ethyl-11αhydroxyprogesterone and 12α-methyl - $\Delta^{1,4}$-pregnadiene-11α-ol-3,20-dione, respectively.

EXAMPLE 9

*12α-Methyl-11α-Hydroxyprogesterone 11α-Acetate (XII)*

A solution of 50 mg. of 12α-methyl-11α-hydroxyprogesterone in 1 ml. of pyridine and 0.3 ml. of acetic anhydride is heated at 80° for 3 hours. The mixture is then diluted with iced water, the precipitate collected, washed with water and dried in vacuo. Two crystallizations from acetone-hexane gives about 33 mg. of the 11α-acetate (XII) having M.P. about 191–193°; $[\alpha]_D$ +159 (c. 1.05 in $CHCl_3$);

$\lambda_{max}^{Alc.}$ 239 m$\mu$ (14,700); $\lambda_{max}^{Nujol}$ 5.80, 5.90, 5.98, 6.20, 8.05.

*Analysis.*—Calcd. for $C_{23}H_{34}O_4$ (386.51): C, 74.57; H, 8.87. Found: C, 74.98; H, 8.96.

Similarly, by substituting other acylating agents for the acetic anhydride in the procedure of Example 9, the corresponding acyloxy derivatives are formed. Thus, propionic anhydride and benzoyl chloride yield the 11α-propionate and 11α-benzoate, respectively. Furthermore, if 12α-ethyl-11α-hydroxyprogesterone and 12α-methyl-$\Delta^{1,4}$-pregnadiene-11α-ol-3,20-dione is substituted for the 12α-methyl-11α-hydroxyprogesterone in the procedure of Example 9, the corresponding respective 11α-acetates are obtained.

The invention may be variously otherwise embodied within the scope of the appended claims.

What is claimed is:

1. A compound selected from the group consisting of steroids of the formula

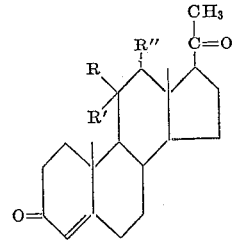

and

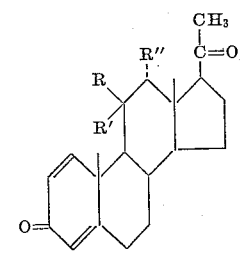

wherein R is hydrogen, R' is β-hydroxy, and R" is lower alkyl.

2. 12α-methyl-11β-hydroxyprogesterone.

3. A process for preparing a steroid selected from the group consisting of 12α-(lower alkyl)-11-ketoprogesterone 3,20-diketal and 12α-(lower alkyl-$\Delta^{1,4}$-pregnadiene-3,11,20-trione 3,20-diketal, which comprises interacting a steroid selected from the group consisting of 9α-fluoro-11-ketoprogesterone 3,20-diketal and 9α-fluoro-$\Delta^{1,4}$-pregnadiene-3,11,20-trione 3,20-diketal with lithium lower alkyl and recovering the 12α-lower alkyl steroid formed.

4. The process of claim 3 wherein the lithium reactant is lithium methyl.

References Cited in the file of this patent

UNITED STATES PATENTS 2,702,291     Sondheimer et al.     Feb. 15, 1955

FOREIGN PATENTS 739,597     Great Britain     Nov. 2, 1955